(12) United States Patent
Bozkurt et al.

(10) Patent No.: US 11,814,459 B2
(45) Date of Patent: *Nov. 14, 2023

(54) AQUEOUS SOLUTION METHOD FOR FORMING A HYDROGEL COMPOSITION

(71) Applicant: Imam Abdulrahman Bin Faisal University, Dammam (SA)

(72) Inventors: Ayhan Bozkurt, Dammam (SA); Seyda T. Gunday Anil, Dammam (SA); Ismail Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,378

(22) Filed: May 16, 2023

(65) Prior Publication Data

US 2023/0279163 A1 Sep. 7, 2023

Related U.S. Application Data

(63) Continuation of application No. 17/819,956, filed on Aug. 16, 2022, now Pat. No. 11,708,435, which is a continuation of application No. 16/503,957, filed on Jul. 5, 2019, now Pat. No. 11,479,623.

(51) Int. Cl.
| | |
|---|---|
| *C08F 30/02* | (2006.01) |
| *B01J 20/26* | (2006.01) |
| *C02F 1/28* | (2023.01) |
| *C08F 230/02* | (2006.01) |
| *C08J 3/075* | (2006.01) |
| *C08J 3/24* | (2006.01) |
| *C02F 101/30* | (2006.01) |
| *C02F 103/30* | (2006.01) |

(52) U.S. Cl.
CPC .............. *C08F 30/02* (2013.01); *B01J 20/267* (2013.01); *C02F 1/285* (2013.01); *C08F 230/02* (2013.01); *C08J 3/075* (2013.01); *C08J 3/24* (2013.01); *C02F 2101/308* (2013.01); *C02F 2103/30* (2013.01); *C08J 2343/02* (2013.01)

(58) Field of Classification Search
None
See application file for complete search history.

(56) References Cited

U.S. PATENT DOCUMENTS

| | | | |
|---|---|---|---|
| 8,657,123 | B2 | 2/2014 | Okabe et al. |
| 9,956,314 | B2 | 5/2018 | Skaria et al. |
| 2010/0093929 | A1 | 4/2010 | Destarac |
| 2010/0280169 | A1 | 11/2010 | Destarac |
| 2015/0051310 | A1 | 2/2015 | Stansbury |

OTHER PUBLICATIONS

Kawauchi et al. (Journal of Polymer Science: Part A: Polymer Chemistry, 2010, 48, 1677-1682). (Year: 2010).*

(Continued)

*Primary Examiner* — Clare M Perrin
(74) *Attorney, Agent, or Firm* — Oblon, McClelland, Maier & Neustadt, L.L.P.

(57) ABSTRACT

Cross-linked polyvinyl polymers comprising charged groups and methods of making are disclosed. The polymers are effective and durable adsorbent of dyes from aqueous solutions. Also, a method of removal of dyes from contaminated water is disclosed.

8 Claims, 9 Drawing Sheets

(56) References Cited

OTHER PUBLICATIONS

Kim, et al. ; Poly(arlyene ether sulfone) based semi-interpenetrating polymer network membranes containing cross-linked poly (vinyl phosphonic acid) chains for fuel cell applications at high temperature and low humidity conditions ; Journal of Power Sources, vol. 293 ; pp. 539-547 ; Oct. 20, 2015 ; Abstract Only ; 2 Paegs.

Elliot, et al. ; Synthesis and characterisation of novel methyl methacrylate-2-(dimethylamino)ethyl methacrylate copolymer salts containing polymerisable anions; Polymer, vol. 44, Issue 14 ; pp. 3775-3784 ; Jun. 2003 ; Abstract Only ; 1 Page.

Nakhjiri, et al. ; Poly(AA-co-VPA) hydrogel cross-linked with N-maleyl chitosan as dye adsorbent: Isotherms, kinetics and thermodynamic investigation ; International Journal of Biological Macromolecules, vol. 117 ; pp. 152-166 ; Oct. 1, 2018 ; Abstract Only ; 2 Pages.

Nakhjiri, et al. ; Effect of bis[2-(methacryloyloxy)ethyl] phosphate as a crosslinker on poly(AAmco-AMPS)/Na-MMT hydrogel nanocomposite as potential adsorbent for dyes: kinetic, isotherm and thermodynamic study ; Journal of Polymer Research ; Nov. 2018 ; Abstract Only ; 2 Pages.

\* cited by examiner

AQUEOUS SOLUTION METHOD FOR FORMING A HYDROGEL COMPOSITION

CROSS-REFERENCE TO RELATED APPLICATIONS

The present application is a Continuation of U.S. application Ser. No. 17/819,956, now allowed, having a filing date of Aug. 16, 2022, which is a Continuation of U.S. application Ser. No. 16/503,957, now U.S. Pat. No. 11,479,623, having a filing date of Jul. 5, 2019.

BACKGROUND OF THE INVENTION

Field of the Disclosure

The present invention relates to a cross-linked polyvinyl matrix and use thereof for treating water to remove organic dyes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Water treatment is any process that improves water quality suitable for a specific end-use. The end use may include, but is not limited to drinking, industrial water supply, irrigation, river flow maintenance, water recreation or releasing the water to the environment. Water treatment removes contaminants and undesirable components, or reduces their concentration so that the water becomes fit for its intended end-use. Water treatment is an essential process for healthy environment that can sustain all forms of life including human, animals, and plants.

The textile industry is a major contributor to environmental pollution of water resources due to the release dyes into surface water, which in turn contaminates soil and underground water. Most synthetic dyes are inert and non-biodegradable aromatic compounds, and thus, accumulate in the environment. Ingestion of contaminated water by humans and animals may be toxic and potentially carcinogenic. Several methods have been developed and used to remove dyes from water including coagulation, adsorption, chemical oxidation, froth floatation, and adsorption. The adsorption method is effective, efficient, and economical for treatment of wastewater-contaminated with dyes.

U.S. Pat. No. 8,657,123B2 discloses a composite of a semipermeable membrane comprising a silicon compound and a silicon free compound. The silicon compound has an ethylenically unsaturated group and a hydrolysable group both of which are directly bonded to the silicon atom. The silicon free compound has an ethylenically unsaturated group and phosphonic, phosphoric, or sulfonic acid group. Among the silicon free compound disclosed is vinylphosphonic acid (VPA). The semipermeable composite of U.S. Pat. No. 8,657,123B2 is intended for use in a desalination process and not for removing dyes from contaminated water.

U.S. Pat. No. 9,956,314B2 discloses an adhesive composition for bonding to bone and bone-like structure which comprises a polymerizable multifunctional acidic monomer, one or more multifunctional monomers with one or more ethylenically unsaturated groups, an organically modified calcium phosphate salt, and polymerization initiator. Among the multifunctional acidic monomers disclosed are bis[2-(methacryloyloxy)ethyl] phosphate (BMEP) and VPA. U.S. Pat. No. 9,956,314B2 does not disclose the use of the polymer to remove dyes from contaminated water.

US20100280169A1 discloses an ampholytic co-polymer comprising at least one macromolecular chain B and at least one part A bonded to chain B. Chain B comprises a quaternary ammonium group, and part A is derived from anionic monomer. Among part A monomers disclosed are VPA or ethylenically unsaturated phosphate esters. US20100280169A1 does not disclose the use of the ampholytic co-polymer in removing dyes from contaminated water.

Kim et al. [J. Pow. Sour. (2015) 293, 539-547] disclose a poly(arylene ether sulfone) semi-interpenetrating polymer network membrane formed by polymerizing VPA and BMEP in a solution of N,N-dimethylacetamide comprising poly(arylene ether sulfone). The membrane displays high proton conductivity and is useful for the construction of electrochemical fuel cells. Kim et al. do not disclose the use of the polymer in removing dyes from contaminated water.

Elliot et al. [Polymer (2003) 44 (14) 3775-3784] disclose a series of polymers containing different ratios of methyl methacrylate and 2-(dimethylamino)ethyl methacrylate synthesized by free radical polymerization. The copolymers were converted to salts with acid monomers such as methylacrylic acid, methacryloyloxyethylphosphate, and vinyl phosphonic acid. Elliot et al. do not disclose any particular use for the copolymers or their salts.

Nakhjiri et al. [Inter. J. Biol. Macromol. (2018) 117, 152-166] disclose a hydrogel polymer prepared by polymerizing acrylic acid, VPA, and N-maleyl chitosan. The polymer is able to adsorb methylene blue and crystal violet from aqueous solution.

Nakhjiri et al. [J. Poly. Res. (2018) 25, 244] disclose the synthesis poly(acrylamide-co-2-acrylamido-2-methyl-1-propane sulfonic acid)/sodium montmorillonite hydrogel nanocomposite with different amounts of BMEP as a cross linker which is formed by free radical polymerization. The hydrogel nanocomposite was used in a method to remove crystal violet, methylene blue, and methyl red from aqueous solution. Based on the thermodynamic studies, Nakhjiri et al. disclosed a method of treating water contaminated with dyes comprising the spontaneous adsorption of dye by the nanocomposite followed by desorption of the dye from the nanocomposite by ethanol.

None of the above mentioned polymers is shown to be an effective and durable adsorbent of dyes from aqueous solution. It is therefore one object of the disclosure is to provide a durable crosslinked polyvinyl matrix comprising ionizable groups as an efficient adsorbent of dyes from aqueous medium.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

One aspect of the invention is directed crosslinked polyvinyl polymer prepared by polymerizing a vinyl compound having chemical formula I:

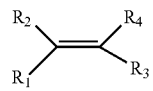

Formula I in the presence of a cross linking compound having formula II:

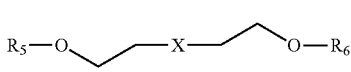

Formula II wherein $R_1$ is phosphonate, phosphate, sulfonate, carboxylate or $CH_2$—NRR'; R and R' are independently hydrogen, methyl, ethyl, propyl; or isopropyl; $R_2$, $R_3$, and $R_4$ are independently hydrogen, sulfonate, carboxylate, phosphonate, optionally substituted methyl, ethyl, propyl, optionally substituted cycloalkyl, optionally substituted aryl or heteroaryl; $R_5$ and $R_6$ are independently acryloyl, methylacryloyl, vinyl, propenyl, acetyleneyl and methylenyl acetylenic; and X is phosphate, sulfate, oxygen, keto group, carbamide, carbamate, carboxamide, or carbonate; and the cross linking compound of formula II is in an amount in the range of 2 mol. % to 60 mol. % of the total molar amount of the vinyl compound of formula I and the cross linking compound of formula II.

In a preferred embodiment, the vinyl compound of formula I is selected from the group consisting of vinylphoshonic acid (VPA), vinylsulfonic acid, acrylic acid, 2-methyl acrylic acid, malieic acid, and fumaric acid.

In another preferred embodiment, the vinyl compound of formula I is VPA.

In another preferred embodiment, the cross linking compound of formula II is bis[2-(methyacryloyloxy)ethyl] phosphate (BMEP), bis[2-(methyacryloyloxy)ethyl] carbonate, or bis[2-(methyacryloyloxy)ethyl] sulfate.

In another preferred embodiment, the cross linking compound of formula II is BMEP.

In another preferred embodiment, the cross linking compound of formula II is in an amount in the range of 10 mol. % to 50 mol. % of the total molar amount of the vinyl compound of formula I and the cross linking compound of formula II.

In a more preferred embodiment, the cross linking compound of formula II is in an amount of about 40 mol. % of the total molar amount of the vinyl compound of formula I and the cross linking compound of formula II.

In another preferred embodiment, the vinyl compound of formula I is VPA and the cross linking compound of formula II is BMEP.

In another preferred embodiment, the cross linking compound of BMEP is in an amount in the range of 10 mole % to 50 mol. % of total molar amount of VPA and BMEP.

In another preferred embodiment, the cross linking compound of BMEP is about 40 mol. % of total molar amount of VPA and BMEP.

Another aspect of the invention is directed to a method of making a cross linked polymer comprising:

mixing aqueous solution of vinyl compound having chemical formula I:

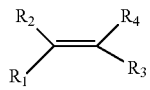

Formula I and an aqueous solution of a cross linking compound having formula II:

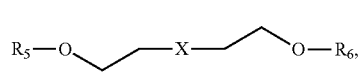

Formula II optionally adding a polymerization initiator to the aqueous solution to form a mixture, and
initiating the polymerization reaction;
wherein $R_1$ is phosphonate, phosphate, sulfonate, carboxylate, or $CH_2$—NRR'; R and R' are independently hydrogen, methyl, ethyl, propyl; or isopropyl; $R_2$, $R_3$, and $R_4$ are independently hydrogen, sulfonate, carboxylate, phosphonate, optionally substituted methyl, ethyl, propyl, optionally substituted cycloalkyl, optionally substituted aryl or heteroaryl; $R_5$ and $R_6$ are independently acryloyl, methylacryloyl, vinyl, propenyl, acetylenyl, and acetylenic methylene; and X is phosphate, sulfate, oxygen, keto group, carbamide, carbamate, carboxamide, or carbonate; and the cross linking compound of formula II is in an amount in the range of 2 mol. % to 60 mol. % of the total molar amount of the vinyl compound of formula I and the cross linking compound of formula II.

In a preferred embodiment, the polymerization initiator is selected from the group consisting of an azo compound, a ketone, organic peroxide, and inorganic peroxide.

In a more preferred embodiment, the azo compound is azobis(2-methylpropionamidine dihydrochloride).

In another preferred embodiment, initiating the polymerization comprises heating the mixture at a temperature in the range of 50 to 150° C.

In a more preferred embodiment, initiating the polymerization reaction comprises heating the mixture at a temperature in the range of 70 to 90° C.

In another preferred embodiment, initiating the polymerization reaction comprises irradiating the mixture with ultraviolet/visible light.

In another preferred embodiment, the compounds of formula I, formula II, and the polymerization initiator are VPA, BMEP, and azobis(2-methylpropionamidine dihydrochloride), respectively.

Another aspect of the invention is directed to a method of removing a dye from contaminated water comprises:

contacting the contaminated water with the cross linked polymer of the invention, allowing the polymer to be in contact with for a time in the range of 5 minutes to 60 minutes, and
removing the polymer.

In another preferred embodiment, the polymer contains a cross linking compound in an amount in the range of 10 mole % to 50 mole % of the total molar amount of vinyl compound and the cross linking compound.

In another preferred embodiment, the dye is one or more of methylene blue, methyl orange, basic violet, parabase, bromophenol blue and natural ink.

In another preferred embodiment, the method further comprises reactivating the polymer by treatment with an organic solvent.

In a more preferred embodiment, the solvent is an alcohol selected from the group consisting of methanol, ethanol, propanol, isopropanol, and butanol and isomers thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
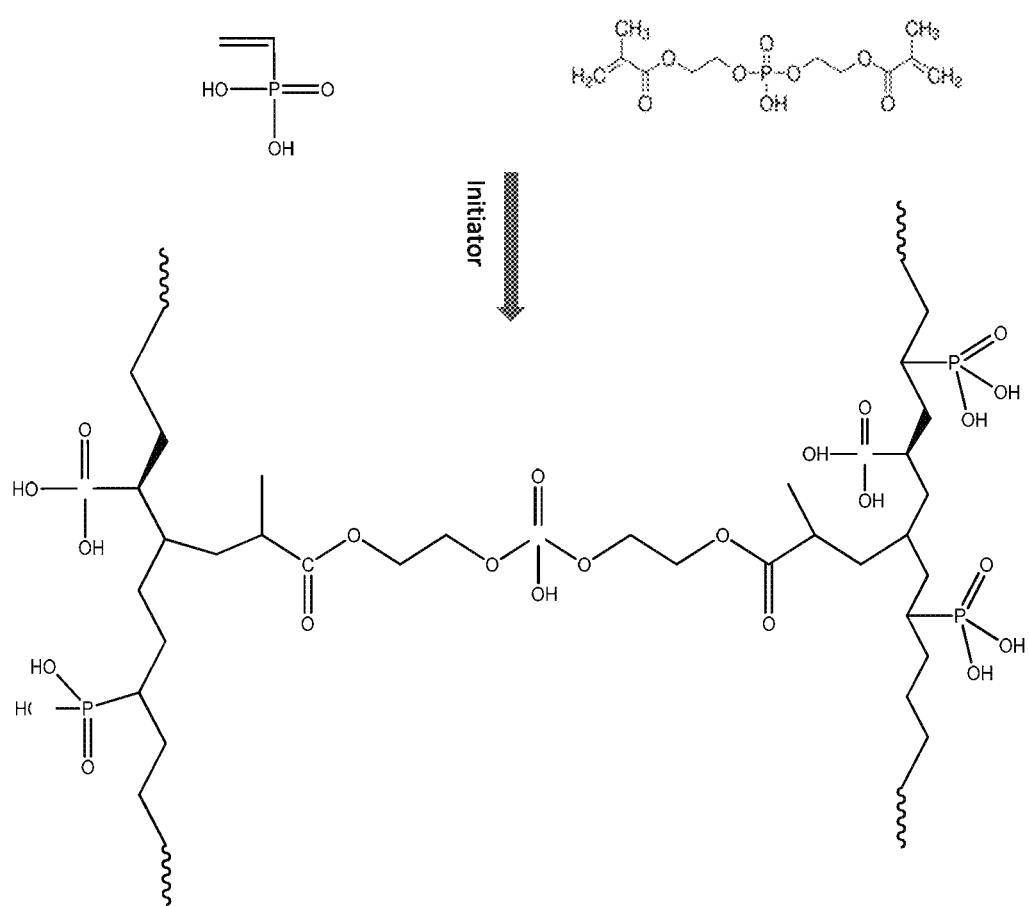
FIG. 1 shows scheme for the synthesis of a polyvinylphosphonic acid/bis[2-(methyacryloyloxy)ethyl]phosphate (PVPA-BMEP) matrix.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more".

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the term "substituted" refers to at least one hydrogen atom that is replaced with a non-hydrogen group, provided that normal valences are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{10}$, preferably $C_1$ to $C_6$, more preferably $C_2$ to $C_3$, and specifically includes, but is not limited to, methyl, trifluoromethyl, ethyl, n-propyl, isopropyl, n-butyl, sec-butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "alkenyl" refers to a straight, branched, or cyclic hydrocarbon fragment containing at least one C=C double bond. Exemplary alkenyl groups include, without limitation, 1-propenyl, 2-propenyl (or "allyl"), 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, and 9-decenyl.

The term "alkynyl" refers to a straight or branched hydrocarbon fragment containing at least one CC triple bond. Exemplary alkynyl groups include, without limitation, ethynyl, 1-propynyl, 2-propynyl (i.e., propargyl), 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, 5-hexynyl, 1-heptynyl, 2-heptynyl, 3-heptynyl, 4-heptynyl, 5-heptynyl, 6-heptynyl, 1-octynyl, 2-octynyl, 3-octynyl, 4-octynyl, 5-octynyl, 6-octynyl, 7-octynyl, 1-nonynyl, 2-nonynyl, 3-nonynyl, 4-nonynyl, 5-nonynyl, 6-nonynyl, 7-nonynyl, 8-nonynyl, 1-decynyl, 2-decynyl, 3-decynyl, 4-decynyl, 5-decynyl, 6-decynyl, 7-decynyl, 8-decynyl, and 9-decynyl.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

As used herein, the term "aryl" unless otherwise specified refers to functional groups or substituents derived from an aromatic ring including, but not limited to, phenyl, biphenyl, napthyl, anthracenyl, thienyl, and indolyl.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkanoyl", as used herein, refers to an alkyl group of specified number of carbon atoms that is bound to an oxygen atom through a double bond. Exemplary alkanoyl groups include, but are not limited to, formyl, acetyl, propanoyl, butyryl, and hexanoyl.

The term "aroyl" as used in this disclosure refers to an aromatic carboxylic acyl group includes, for example, benzoyl, 1-naphthoyl, and 2-naphthoyl.

The term "halogen", as used herein, means fluorine, chlorine, bromine, and iodine.

As used herein a "polymer" or "polymeric resin" refers to a large molecule or macromolecule, of many repeating subunits and/or substances composed of macromolecules.

As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeating units together successively along the chain. The process by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst.

One aspect of the invention is directed to a crosslinked polyvinyl polymer prepared by polymerization of a vinyl compound in the presence of a cross linking compound. The vinyl compound can be any compound comprising a double bond and a charged group in aqueous solution at pH in the range of 2-11, preferably, 3-10, preferably 4-9, preferably 5-8. Examples of charged groups include, but not limited to phosphonate phosphate, sulfonate, sulfate, carboxylate, and ammonium group. The cross linking compound may be any compound which is able to cross-link polyvinyl polymer such as those described herein below.

In some embodiments, the vinyl compound has the chemical formula I:

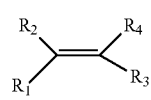

Formula I wherein $R_1$ is phosphonate, phosphate, sulfonate, carboxylate or $CH_2$—$NRR'$; R and R' are independently hydrogen, methyl, ethyl, propyl; or isopropyl; $R_2$, $R_3$, and $R_4$ are independently hydrogen, sulfonate, carboxylate, phosphonate or phosphate, optionally substituted alkyl group such as, but not limited to methyl, ethyl, propyl, optionally substituted cycloalkyl such as but not limited cyclobutyl, cyclopentyl, or cyclohexyl, optionally substituted aryl such as phenyl, o-, m-, or p-phenyl carboxylic acid, o-, m-, or p-aminopbenzyl, and the like, optionally substituted heteroaryl such as but not limited to pyrrole, imidazole, triazole, thiophene, furan, and the like. The vinyl compound of formula I is present in co-polymerized form in the crosslinked polyvinyl polymer in an amount in the range of 30 mol. % to 95 mol. % of the total molar amount of formula I and II.

A cross linking compound of formula II is present in co-polymerized form in the crosslinked polyvinyl polymer in an amount in the range of 2 mol. % to 60 mol. % of the total molar amount of formula I and II. The cross-linking compound is a monomer of formula II having two or more polymerizable moieties separated by a linker comprising a hydrophilic moiety such as, but not limited to phosphate, sulfate, oxygen, keto group, carbamide, carbamate, carboxyamide, carbonate, and the like. As used herein the word "polymerizable moiety" is a functional moiety in a polymerization reaction, preferably in a free radical initiated polymerization reaction. Examples of polymerizable moieties include, but are not limited to vinyl, acryloyl, methacryloyl, acrylamide, acetylenic, and the like. Examples of cross-linker compounds include, but are not limited to diallyl hydrogen phosphate, bis-(2-methylacryloyloxyethyl) phosphate, divinyl carbonate, diallyl carbonate, bis(2-methylallyl)carbonate, diallyl urea, divinylsulfate, diallyl sulfate, diethylene glycol divinyl ether, piperazine diacrylamide, N,N'-ethylenebisacrylamide, ethyleneglycoldiallyl ether, ethylene glycol dimethacrylate, trimethyloylpropane trimethacrylate, diethyleneglycol dimethacrylate, bis(glycerol dimethacrylate) phosphate, glycerol dimethylacrylate, divinyl ketone, and the like.

In some embodiments, the cross linking compound has chemical formula II:

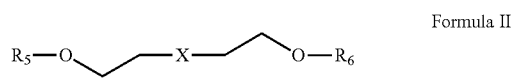

Formula II wherein $R_5$ and $R_6$ are independently acryloyl, methylacryloyl, vinyl, propenyl, acetyleneyl and methylenyl acetylenic, and X is phosphate, sulfate, oxygen, carbonyl group, carbamide, carbamate, carboxamide, or carbonate. Examples of compounds of formula II include but are not limited to bis[2-(methyacryloyloxy)ethyl] phosphate (BMEP), bis[2-(methyacryloyloxy)ethyl] carbonate, bis[2-(methyacryloyloxy)ethyl] sulfate, divinyl ketone, and the like.

In some preferred embodiments, cross-linked vinyl polymer comprises an amount of vinyl compound of formula I in the range of 30-95 mole %, preferably 35-80 mole %, preferably 40-60 mole %, and preferably 40-50 mole % of the total molar amount of the vinyl compound of formula I and the cross linking compound of formula II.

In some preferred embodiments, the cross linking compound of formula II is present in co-polymerized form in the crosslinked polyvinyl polymer in an amount in the range of 1 mole % to 60 mole %, preferably 5 mole % to 55 mole %, preferably 10 mole % to 50 mole %, preferably 15 mole % to 45 mole %, preferably 20 mole % to 40 mole %, and preferably about 40 mole % of the vinyl compound of formula I.

In a preferred embodiment, the cross linked polymer of the invention is polyvinylphosphonic acid-bis[2-(methyacryloyloxy)ethyl] phosphate polymer prepared by polymerizing vinlyphosphonic acid (VPA) in the presence of bis[2-(methacryloyloxy)ethyl] phosphate (BMEP), wherein BMEP is present in co-polymerized form in the crosslinked polyvinyl polymer in an amount in the range of 5 mole % to 55 mole %, preferably 10 mole % to 50 mole %, preferably 15 mole % to 45 mole %, and preferably 20 mole % to 40 mole % of the total molar amount of VPA and BMEP. In a particularly preferred embodiment, the amount of BMEP is about 40 mole % of the total molar amount of VPA and BMEP.

Another aspect of the invention is directed to a method of making the cross-linked polyvinyl polymer of the invention. The method comprises free radical co-polymerization of a vinyl compound with a cross-linking compound. The polymerization reaction may be initiated by several means including but not limited to thermochemical, photochemical, electrochemical, sonication, ionizing radiation, redox reaction and plasma which are described herein below.

Thermal and photochemical initiations are the most commonly used initiating methods. Thermal and photochemical polymerization initiators are chemical compounds that produce free radicals on decomposition by heating or irradiation with UV/visible light. They may be organic or inorganic compounds. Peroxides and azo compounds are well-known initiators as they produce free-radicals generated by heating or irradiation with UV/visible light. The rate of formation of free radical from peroxide is highly dependent on the composition of the reaction mixture, solvent, temperature, and pH.

Organic peroxides have a peroxide bond (—O—) which is readily cleaved to give two oxygen radicals. The oxy-radicals are unstable and disproportionate to more stable carbon radicals. For example, di-t-butyl peroxide (tBuOOtBu) produces two t-butoxy radicals (tBuO·) which disproportionate to methyl radicals ($CH_3$·) and acetone. Similarly, benzoyl peroxide ($(PhCOO)_2$) generates two benzoyloxy radicals (PhCOO·), each of which loses carbon dioxide produce a phenyl radical (Ph·). Inorganic peroxides function in similar fashion to organic peroxides. Many polymers are often produced from alkenes upon initiation with peroxydisulfate salts. In solution, peroxydisulfate dissociates to two sulfate radicals anion. The sulfate radical anion adds to one of the carbon atom of a double bond leading to the formation of a sulfate ester bond and a free radical center at the second carbon of the double bond which initiate the polymerization free radical chain reaction.

Azo compounds (R—N═N—R') are precursors of two carbon-centered radicals (R· and R'·) produced by heating or irradiating with UV/visible light with concomitant release of nitrogen gas. For example, heating 2,2'-azobisisobutyronitrile (AIBN) yield two isobutyronitrile radicals according to the equation:

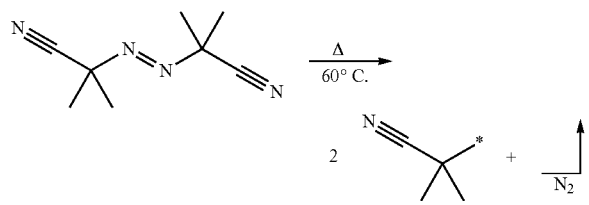

In some embodiments of the method, one or more thermal initiators may be used to initiate the polymerization reaction. Examples of thermal initiator include, but are not limited to tert-amyl peroxybenzoate, 4,4-azobis(4-cyanovaleric acid), 1,1'-azobis(cyclohexanecarbonitrile) (ABCN), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-Bis(tert-butylperoxy) 2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, ammonium persulfate, and sodium persulfate.

In some other embodiments, photoinitiation may be preferred. Examples of photoinitiators include, but not limited to azo Compounds such as but not limited to 4,4'-azobis(4-cyanovaleric acid), 1,1'-azobis(cyclohexanecarbonitrile), 2,2' azobis(2-methylpropionitrile), azobisisobutyronitrile, 2,2'-azobis(2-methylpropionitrile), 2,2-dimethoxy-1,2-diphenylethan-1-one, 2-hydroxy-2-methyl-1-phenylpropanone, 1-hdroxy-cyclohexylphenylketone, benzophenone, isopropyl thioxanthone, 2-ethylhexyl-(4-N,N-dimethyl amino)benzoate, and ethyl-4-(dimethylamino)benzoate.

The amount of thermal or photochemical initiator may vary depending on the nature of the vinyl compound, the cross linking compound, the desired reaction temperature, the rate of thermal or photochemical decomposition of the initiator, and the solvent, if present. In some embodiments, the amount of the initiator is in the range of 0.01-5.0 mole %, preferably 0.05-4.0 mole %, preferably 0.1-3.0 mole %, preferably 0.5-3.0 mole %, preferably 0.8-3.0 mole %, preferably 1.0-2.0 mole %, and preferably about 1% of the total molar amount of formula I and II.

In some other embodiments, other polymerization initiation methods, which do not require chemical initiators, may be used to produce the polymer of the invention. In some embodiments, the polymerization reaction may be initiated by electrolysis of a solution containing both monomer(s) and electrolyte. A monomer molecule will receive an electron at the cathode to become a radical anion, and a monomer molecule will give up an electron at the anode to form a radical cation. The radical ions then initiate free radical (and/or ionic) polymerization. Such a process is particularly useful for coating a permeable surface with the polymer of the invention.

Another method for initiating a polymerization reaction by free radical is by sonicating a monomer(s) or solution thereof with high-intensity ultrasound at frequencies beyond the range of human hearing (16 kHz). Initiation results from the effects of cavitation, i.e., the formation and collapse of cavities in the liquid. The collapse of the cavities generates local high temperatures and pressures leading to excited electronic states, which in turn results in homolytic cleavage of a covalent bond and formation of free radicals.

Another method of initiating polymerization by free radicals involves irradiating a reaction mixture comprising a monomer and a co-monomer with ionizing radiations such as α, β, γ, or X-ray to produce free radicals and thereby initiate the polymerization reaction.

Yet another free-radical initiation method including a redox reaction may be utilized in the method of the invention. The initiation method involves reduction of hydrogen peroxide or an peroxy alcohols by iron(II) ion. Other reductants such as $Cr^{2+}$, $V^{2+}$, $Ti^{3+}$, $Co^{2+}$, and $Cu^{1+}$ can be employed in place of ferrous ion in many instances.

The method of the invention comprises preparing a reaction mixture comprising a vinyl compound, a cross-linking compound, and optionally an initiator. In some embodiments, the reaction mixture may contain a solvent. The solvent may be any solvent that does not interfere with the polymerization reaction. Examples of suitable solvents include, but not limited to water, methanol, ethanol, propanol, butanol, diethyl ether, ethyl methyl ether, and diethyl ether. In some embodiments, the reaction mixture is homogeneous, i.e., the vinyl compound and the cross-linking compound, and initiator, if present, are all in one phase such as being soluble in a solvent. In some other embodiment, the reaction mixture comprises an aqueous phase, water insoluble vinyl compound and/or cross linking compound, and initiator soluble in one of the monomers droplets. Alternatively if the initiator is soluble in water, a reaction mixture comprising suspension of the vinyl compound and cross linking compound suspended in an aqueous solution of the initiator may be prepared and the reaction is initiated as described above In some embodiments, the reaction mixture contains a thermal initiator. In such a case, the reaction may be heated at a temperature in the range of 50 to 150° C., preferably 60 to 120° C., preferably 70 to 100° C., and preferably 70 to 75° C. In some other embodiments, the reaction mixture contains a photo initiator. In such a case, the reaction mixture may be irradiated with UV/visible light at a wave length at which the initiator absorb light.

In some other embodiments, the polymerization reaction may be carried out without any solvent. In such a case, a vinyl compound, a cross linking compound, and optionally initiator are mixed and the mixture heated or irradiated as described above.

A preferred embodiment of the method comprises preparing an aqueous solution of VPA, BMEP, and azo-bis-(2-methylpropionamidine) dihydrochloride as an initiator to form a reaction mixture. The amount of VPA in the reaction mixture is in the range of 30-95 mole %, preferably 35-80 mole %, preferably 40-60 mole %, and preferably 40-50 mole % of the total molar amount of VPA and BMEP. The amount of BMEP in the reaction mixture is at least 5 mole %, preferably 10 mole %, preferably 15 mole %, preferably 20 mole %, preferably 25 mole %, preferably 30 mole %, preferably 35 mole %, preferably 40 mole %, preferably 45 mole %, and preferably 50 mole % of the total molar amount of VPA and BMEP. In one preferred embodiment of the method, the amount of BMEP in the reaction mixture is in the range of 40-45 mole % of the total molar amount of VPA and BMEP. The amount of initiator azo-bis-(2-methylpropionamidine) dihydrochloride is in the range of 0.01-5.0 mole %, preferably 0.05-4.0 mole %, preferably 0.1-3.0 mole %, preferably 0.5-3.0 mole %, preferably 0.8-3.0 mole %, preferably 1.0-2.0 mole %, and preferably about 1 mole % of VPA. The reaction mixture is heated to a temperature in the range of 60-80° C., preferably 65-75° C., and preferably about 70° C. In some embodiments, the cross-linked polyvinyl polymer may contain other monomers to modify the properties polymer such as the charge distribution and the charge density of the polymer in relatively small amount. The modifying monomer may be present in an amount in the range of 1-20 mole %, preferably 3-18 mole %, preferably 5-15 mole %, 7-12 mole %, preferably about 10 mole % of the total molar amount of VPA and BMEP.

Another aspect of the invention is directed to a method of removing dyes from contaminated water. The method comprises contacting the contaminated water with the cross-linked polyvinyl polymer of the invention for a time sufficient to substantially adsorb the dye on the cross-linked polyvinyl polymer and thereby remove the dye from the water, preferably for a time in the range of 5-150 min, 10-120 min, preferably 15-100 min, 20-90 min, preferably 25-80 min, preferably 30-60 min, and preferably 35-40 min.

In a particularly preferred embodiment, the contaminated water is contacted with the polymer for about 30 min. The contacting of water with cross-linked polyvinyl polymer of the invention may be a part of remediation process to remove a dye from waste water from a textile manufacturing facility and release the water to the environment. Alternatively, it may be a step in a multistep process to purify water for human and animal consumption, or agricultural use.

In some embodiments, the cross-linked polyvinyl polymer may be added directly to the water and removed after a time in the range of 5-60 min, preferably 10-50 min, preferably 15-40 min, and preferably about 30 min. The amount of cross-linked polyvinyl polymer added to the water is highly dependent on the amount of dye in the water and the mole % of the cross-linker of the cross-linked polyvinyl polymer. In some embodiment, the amount of cross-linked polyvinyl polymer added to the water is at least 10 mg/L, 20 mg/L, 30 mg/L, 40 mg/L, 50 mg/L, 50 mg/L, 60 mg/L, 70 mg/L, 80 mg/L, 90 mg/L, 100 mg/L, 200 mg/L, 300 mg/L, 400 mg/L, 500 mg/L, 600 mg/L, 700 mg/L, 800 mg/L, 900 mg/L, 1.0 g/L, 1.5 g/L, 2.0 g/L, 2.5 g/L and more. The process may be carried out once or repeated for as many times as needed. In some embodiment, the process is carried out at least once, twice, trice, or more times until the water becomes colorless.

In an alternative embodiments of the method, a column may be packed with a bed of material comprising the cross-linked polyvinyl polymer of the invention alone or in combination with ion exchange resin and/or hydrophobic resin and flowing the water through the bed at a flow rate that allow the water to be in contact with the polymer of the invention for at least 5 min, 10 min, 20 min, 30 min, 40 min, 50 min, or 60 min.

The water treatment method of the invention for the removal of dye may include an additional step(s) to release the bound dyes from the polymer and thereby regenerate the cross-linked polymer of the invention for further use. The regeneration step comprises treating the used polymer with an organic solvent in which the polymer is insoluble or has low solubility. Examples of solvents include, but not limited to alcohols such as but not limited to methanol, ethanol, propanol, isopropanol, butanol, isobutanol, t-butano and the like; chlorinated hydrocarbons such as but not limited to dichloromethane, chloroform, carbontetrachloride, dichloroethane; diols such as ethylene glycol or propylene glycol, hydrocarbons such as but not limited to hexane, cyclohexane, pentane, cyclopentane, benzene, toluene, petroleum ether, and the like; and ethers such as but not limited to dimethyl ether, diethyl ether, and methyl ethyl ether.

Any single dye or combination of dyes contaminating waste water may be fully or partially removed by the method of the invention including but not limited to those dyes derived from acridine, anthraquinone, arylmethan, azo compounds, phthalocyanine, quinone-imine compounds, azine compounds, indamine compounds, indophenol, oxazin compounds, oxazone compounds, thiazine, thiazole, safranine, and xanthene. In some embodiment, the method of the invention may be used to remove more than one dye which may be present in the contaminated water. Examples of particular dyes include but not limited to methylene blue, methyl orange, basic violet, parabase, bromophenol blue, natural ink, alzarin, 7,14-dibenzpyrenequinone, dibromoanthanthrone, indigo, and combination thereof.

Example 1

Vinylphosphonic acid (VPA) was polymerized in the presence of several molar fractions of bis[2-(methacryloyloxy)ethyl] phosphate (BMEP) to produce crosslinked polyvinylphohonic acid hydrogels (PVPA-BMEP) (FIG. 1). The mole ratio of BMEP was varied from 5 to 40% with respect to VPA. Azobis(2-methylpropionamidine dihydrochloride) was used as initiator and the polymerization was carried out in water at 70° C. In a typical preparation, 1.0 g (9.2 mmole) of VPA, 1.2 g (3.7 mmole) of BMEP, 0.025 g (0.09 mmole) of Azobis(2-methylpropionamidine dihydrochloride) were dissolved in deionized ionized water by adjusting the pH to about 9, and the solution is heated at 70° C. for two hours. The precipitated polymer is filtered and washed with ether, and dried in an oven. Table 1 summarizes the content of the final product.

TABLE 1

Content of PVPA-BMEP preparations

| Preparation | PVPA, g | BMEP, g |
|---|---|---|
| PVPA-BMEP-5 mol % | 1.0 | 0.15 |
| PVPA-BMEP-10 mol % | 1.0 | 0.30 |
| PVPA-BMEP-10 mol % | 1.0 | 0.60 |
| PVPA-BMEP-20 mol % | 1.0 | 1.20 |

Example 2

Characterization of the Cross-Liked Polymer

Figure 2:
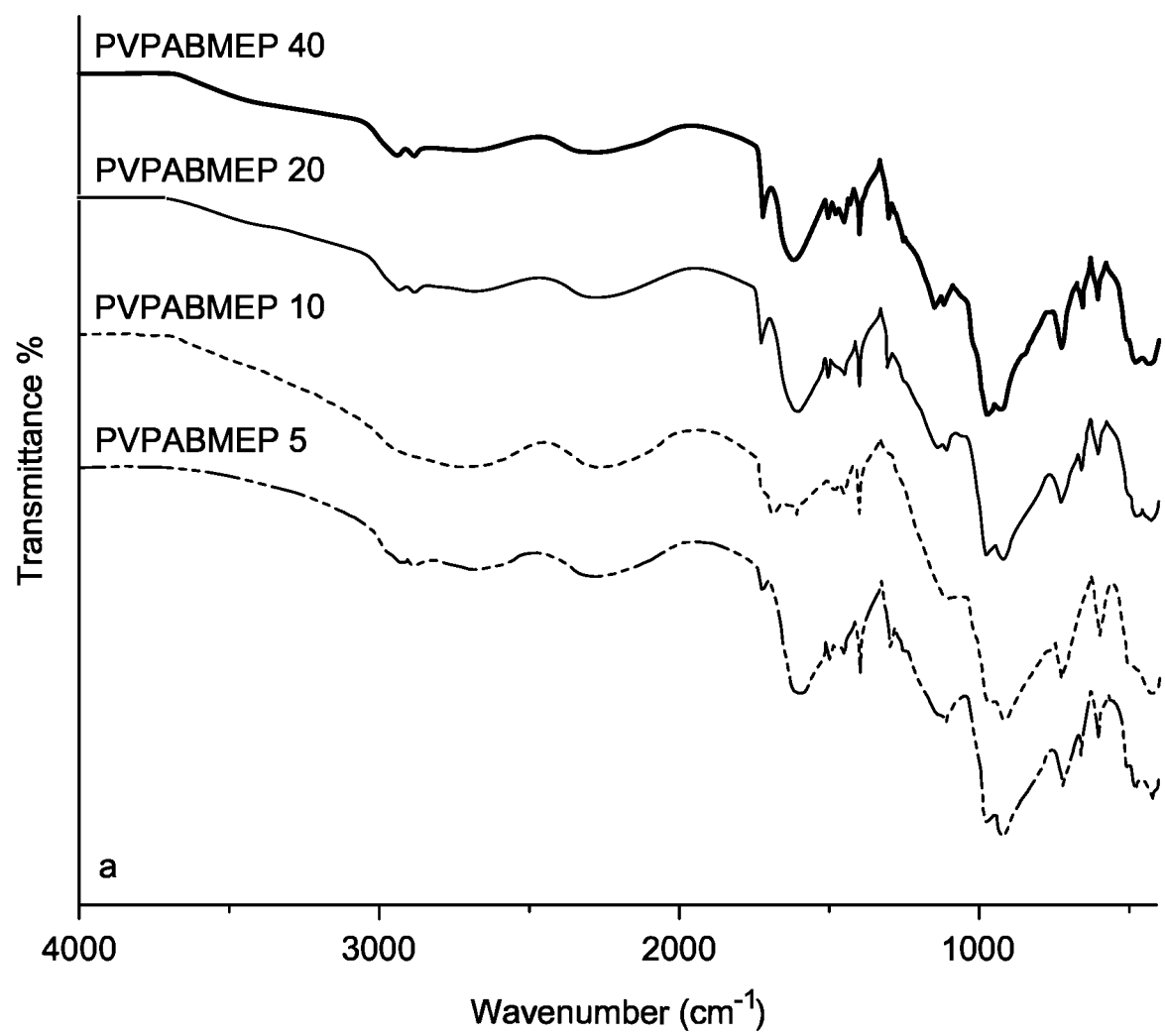
FIG. 2 shows FTIR spectra of PVPA cross-linked with 5 mole %, 10 mole %, 20 mole %, and 40 mole % of BMEP.
Figure 3:
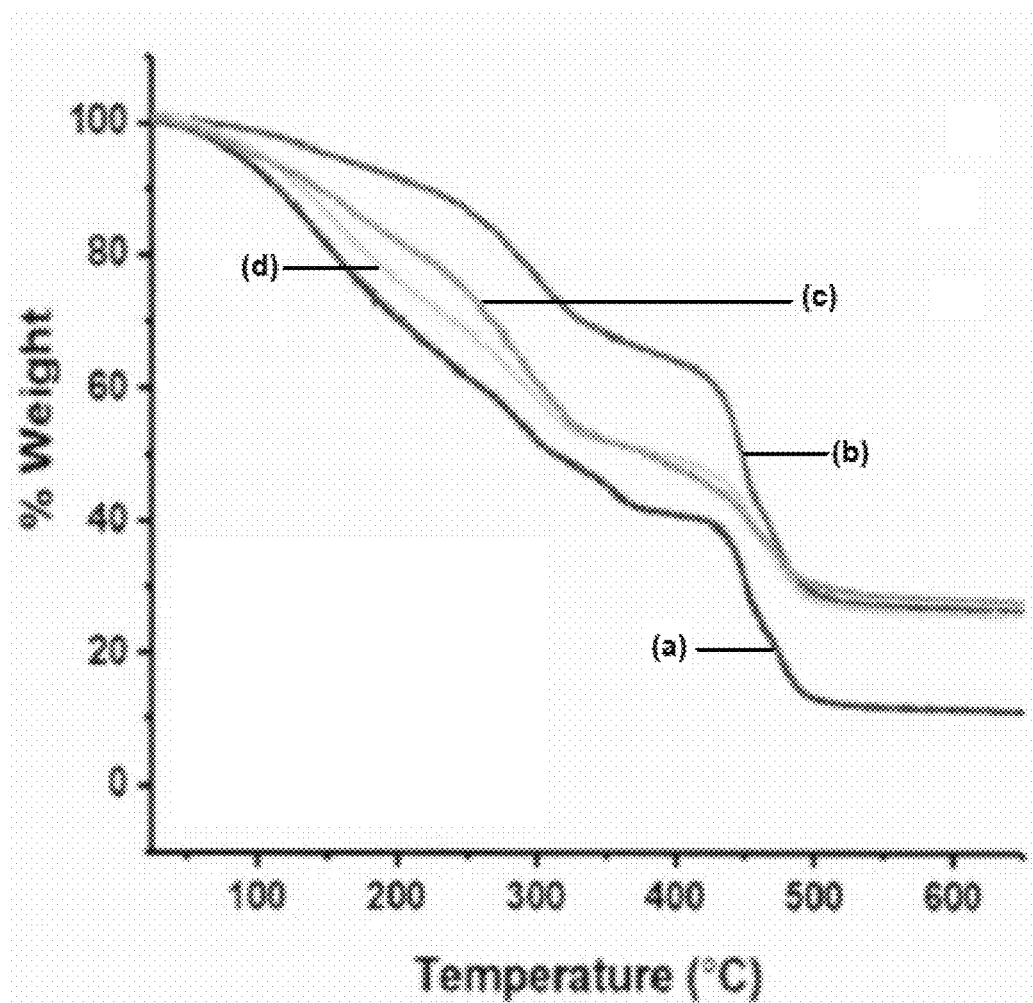
FIG. 3 shows thermogravimetric spectra of PVPA cross-linked with (a) 5 mole %, (b) 10 mole %, (d) 20 mole %, and (c) 40 mole % of BMEP.
Figure 4:
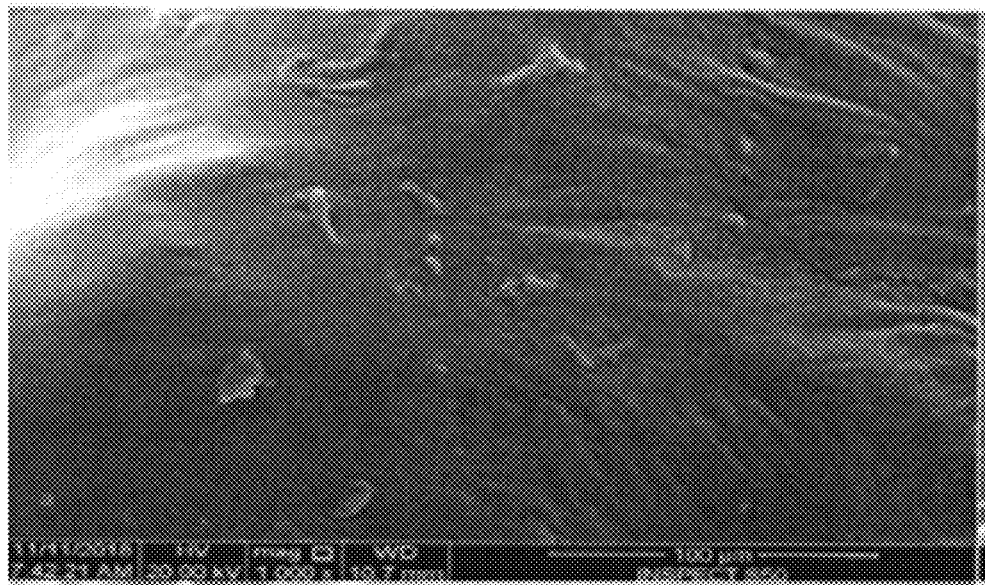
FIG. 4 shows an SEM image of PVPA cross-linked with 5 mole % of BMEP.
Figure 5:
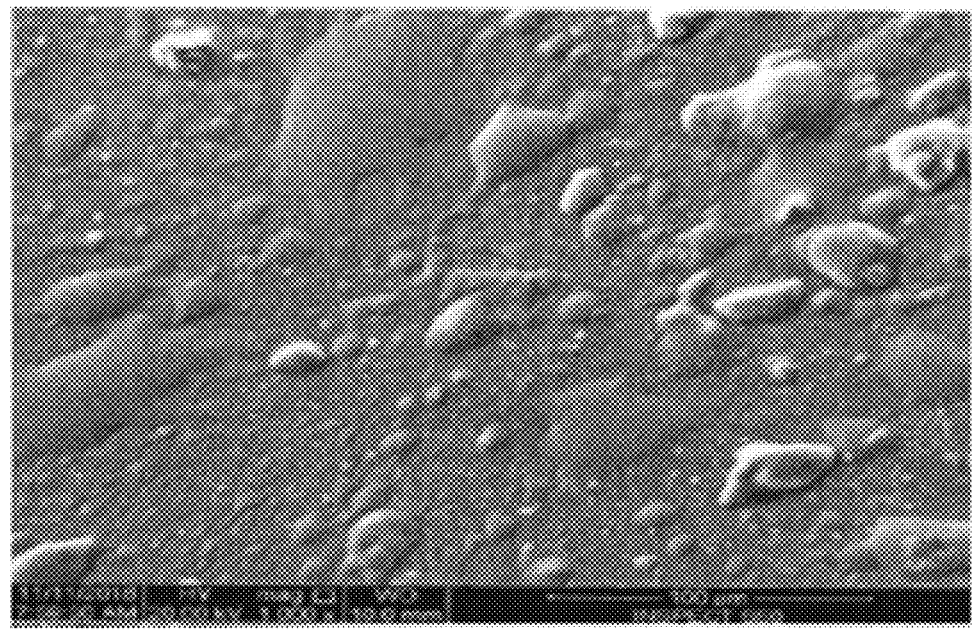
FIG. 5 shows an SEM image of PVPA cross-linked with 10 mole % of BMEP.
Figure 6:
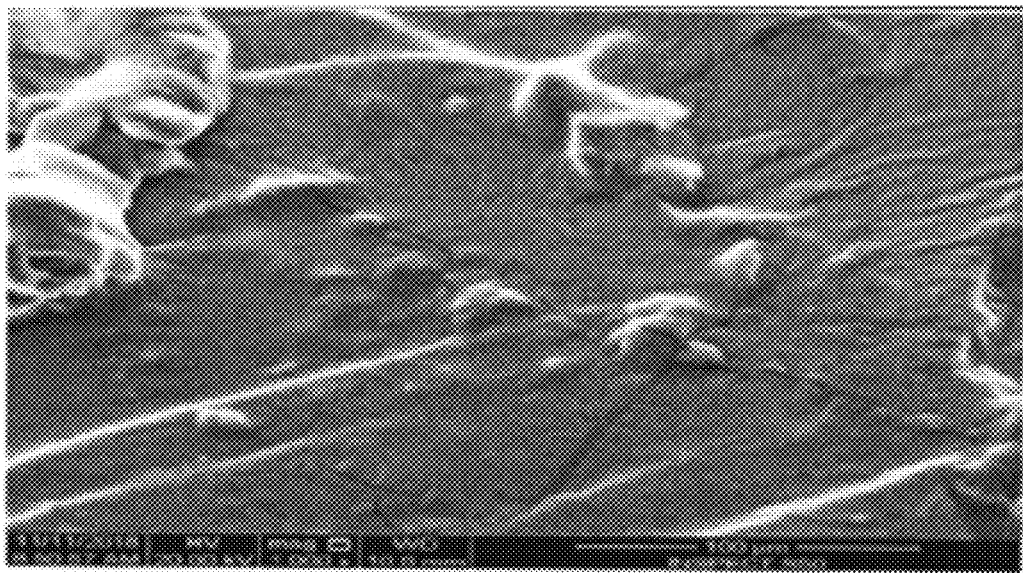
FIG. 6 shows an SEM image of PVPA cross-linked with 20 mole % of BMEP.
Figure 7:
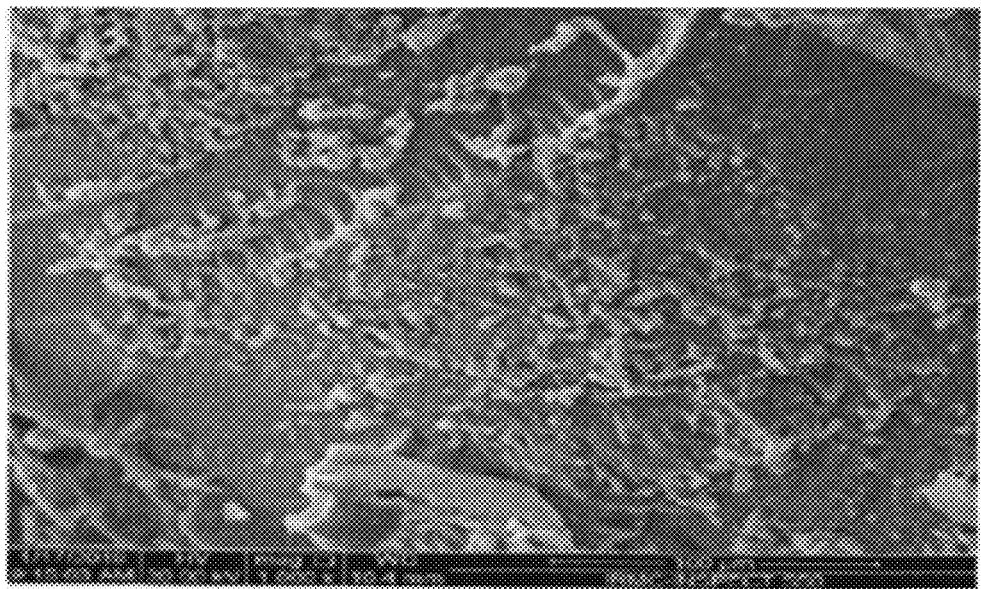
FIG. 7 shows an SEM image of PVPA cross-linked with 40 mole % of BMEP.
Figure 8:
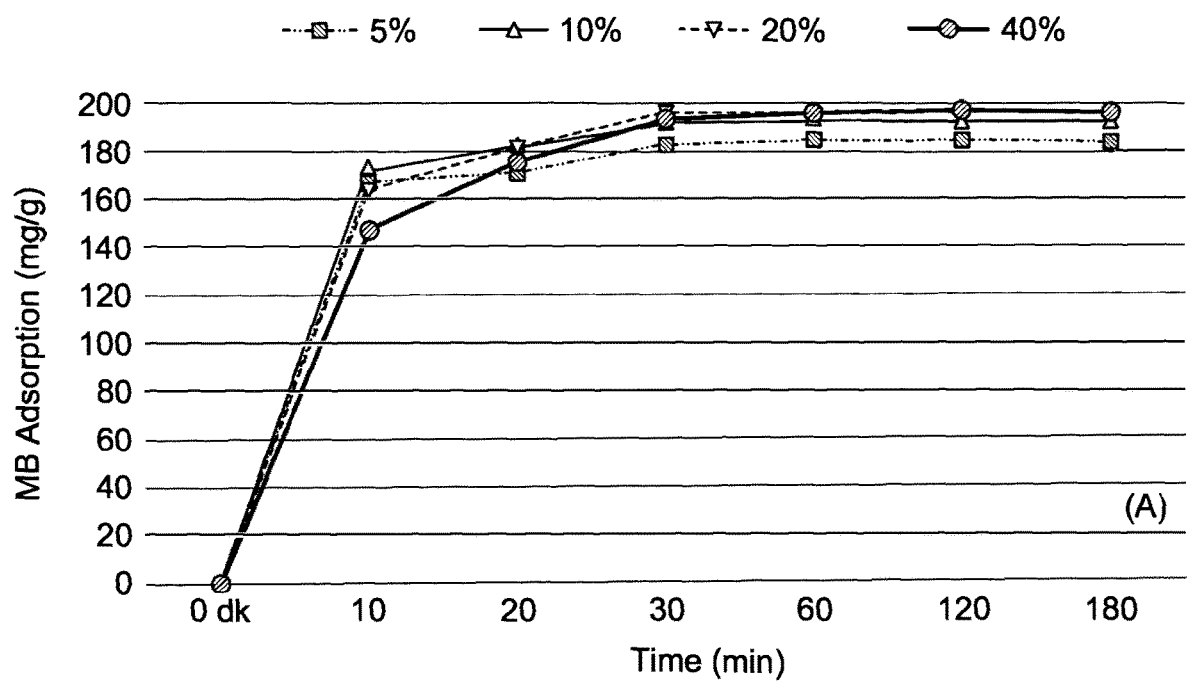
FIG. 8 shows the adsorption characteristics of PVPA cross-linked with 5 mole %, 10 mole %, 20 mole %, and 40 mole % of BMEP at an initial concentration of 100 mg/L methylene blue.
Figure 9:
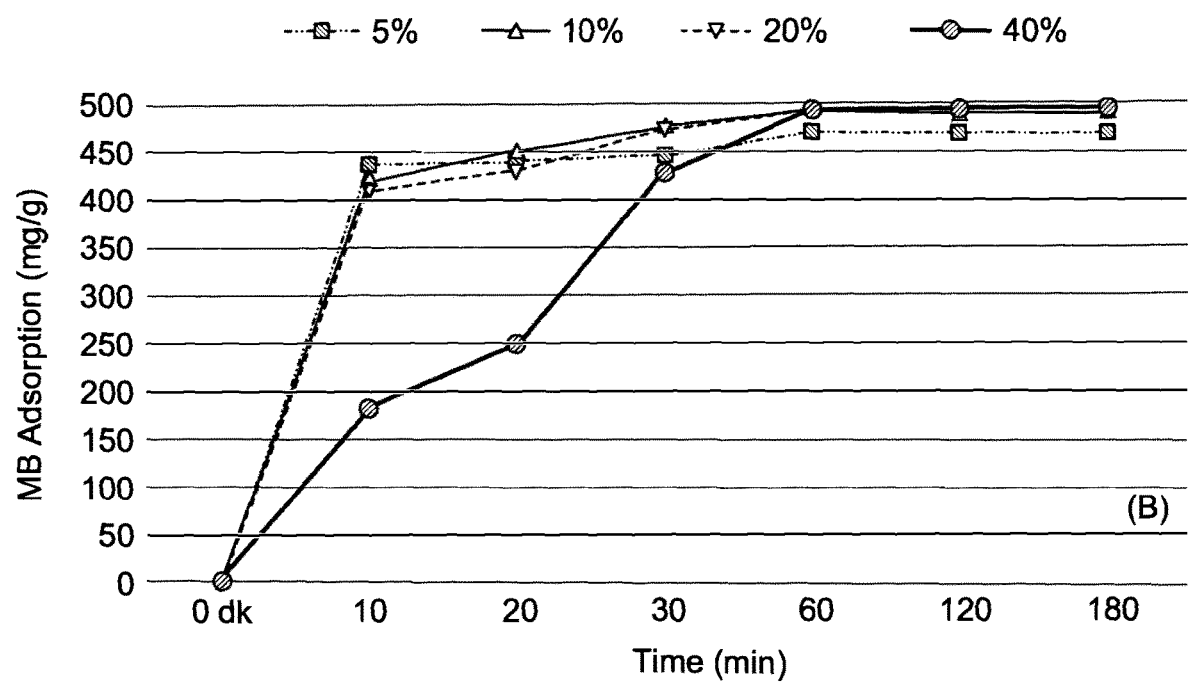
FIG. 9 shows the adsorption characteristics of PVPA cross-linked with 5 mole %, 10 mole %, 20 mole %, and 40 mole % of BMEP at an initial concentration of 250 mg/L methylene blue.
Figure 10:
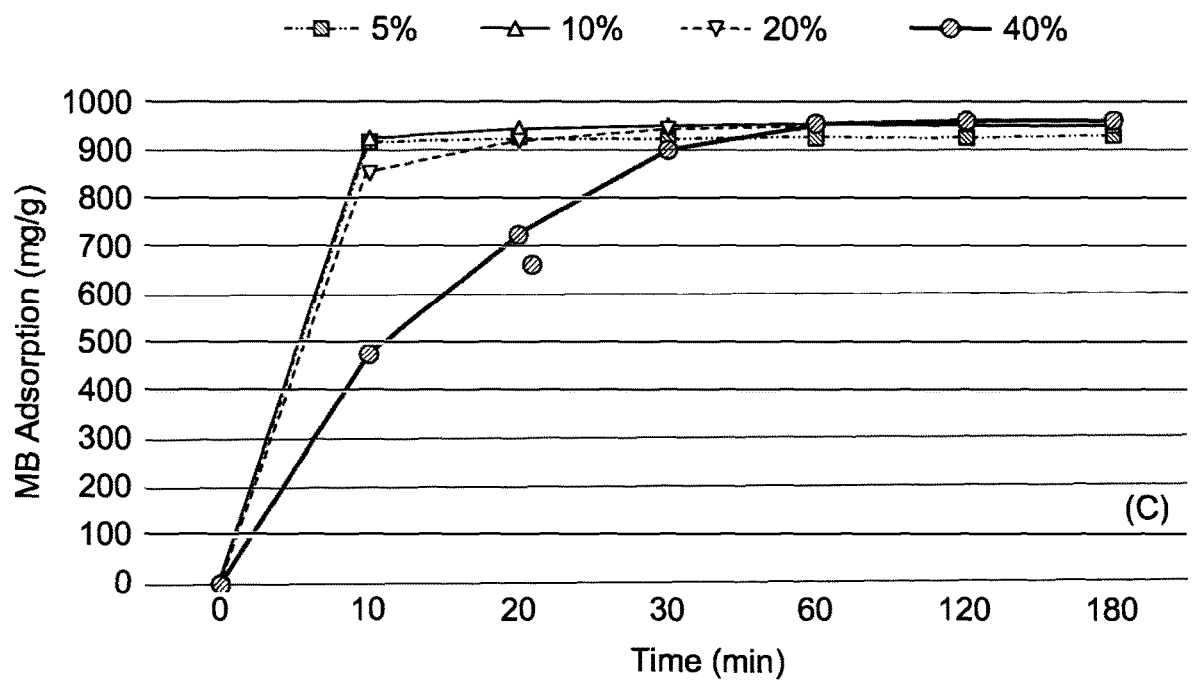
FIG. 10 shows the adsorption characteristics of PVPA cross-linked with 5 mole %, 10 mole %, 20 mole %, and 40 mole % of BMEP at an initial concentration of 500 mg/L methylene blue.
Figure 11:
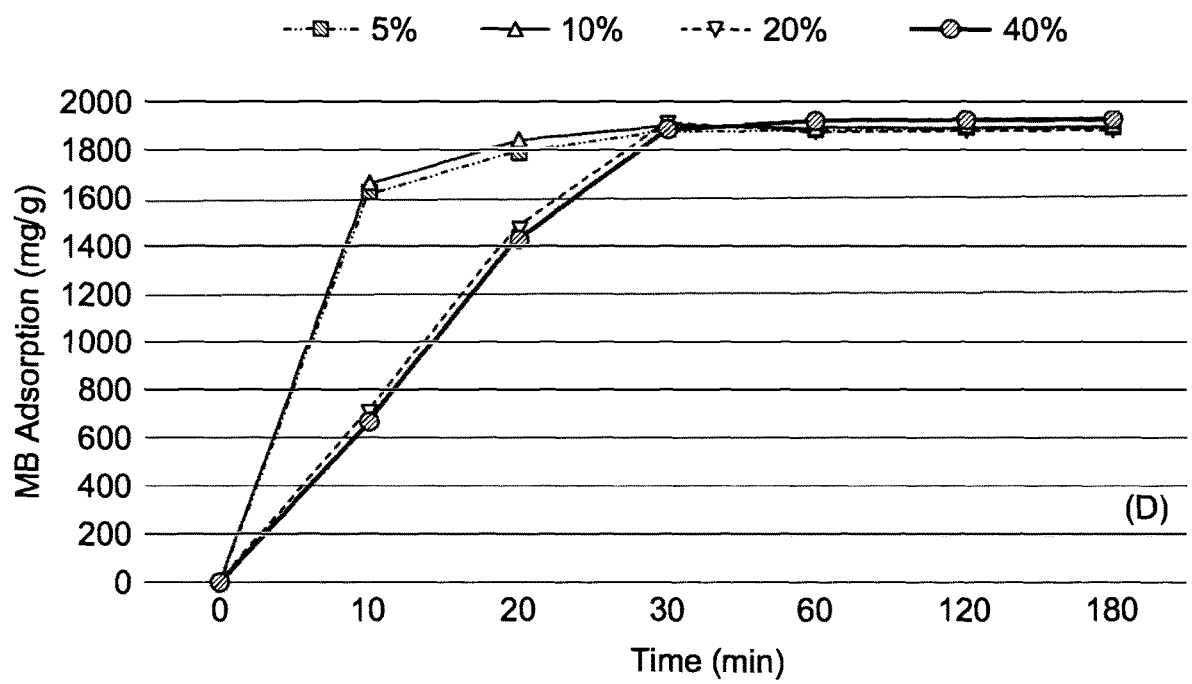
FIG. 11 shows the adsorption characteristics of PVPA cross-linked with 5 mole %, 10 mole %, 20 mole %, and 40 mole % of BMEP at an initial concentration of 1000 mg/L methylene blue.

FIG. 2 shows PVPA-BMEP cross-1 inked polymer matrices with different mole percentages of BM EP. The characteristic broad peak appeared between 990-910 cm$^{-1}$ can be assigned to the (P—O)—H stretching of phosphonic acid groups of the PVPA. The peak at 1150 cm$^{-1}$ belongs to P—O stretching of BMEP and becomes more intense with increasing the mole fraction of BMEP in the matrix. Phosphonic acid group gives additional broad band in the region of 1635 cm$^{-1}$. The carboxyl group (C=O) stretching is clearly observed at 1720 cm$^{-1}$ and becomes more intense as the mole fraction of BMEP is increased. The narrow and weak band at 2880 cm$^{-1}$ and 2900 cm$^{-1}$ are due to the C—H stretching vibrations in methyl and methylene groups of BMEP. The broadening within 3300-2000 cm$^{-1}$ can be attributed to hydrogen bonding network formation among phoshonic acid groups [Sinirlioglu et al. (2014) "Novel composite polymer electrolyte membranes based on poly (vinyl phosphonic acid) and poly (5-(methacrylamido)tetrazole)" Polymer Engineering& Science 55 (2):260-269—incorporated herein by reference in its entierty].

FIG. 2b depicts TGA graph of PVPA/BMEP with different compositions. The thermograms illustrate several steps weight change in the temperature range of measurement. The first step is the weight lost up 100° C. that can be attributed to loss of absorbed humidity. The second step which begins at 120° C. and continues until 220° C. can be attributed to condensation reactions among phosphonic acid groups (Sinirlioglu et al.). The degradation of BMEP occurs at a temperature between 220-430° C. Above 430° C., further degradation of the cross-linked polymer occurs [Vilela et al. (2018) Poly(bis[2-(methacryloyloxy)ethyl] phosphate)/Bacterial Cellulose Nanocomposites: Preparation, Characterization and Application as Polymer Electrolyte Membranes. Applied Sciences 8 (7)].

The SEM micrographs of FIGS. 4-7 show the surface morphology of the final purified materials.

Example 3

Figure 12:
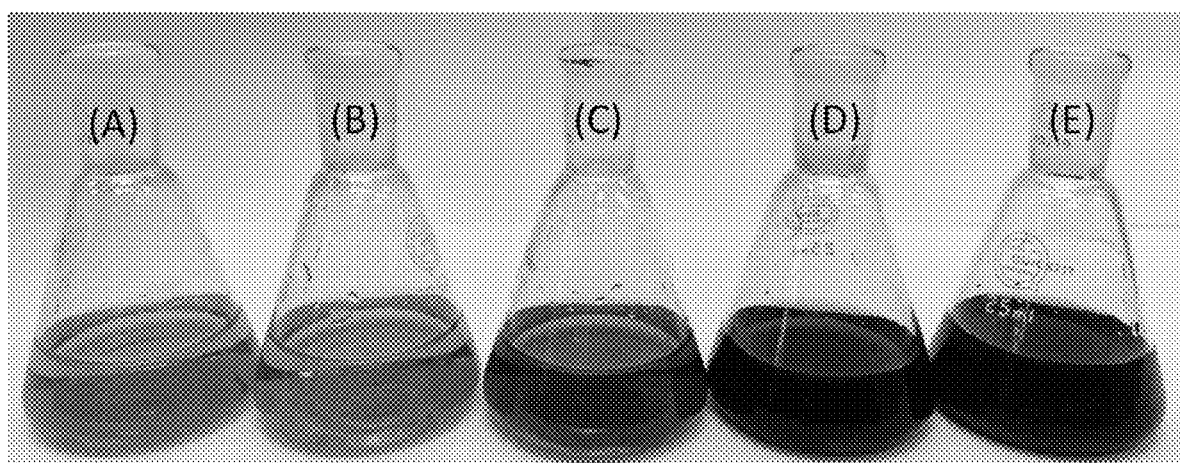
FIG. 12 shows the color of aqueous solutions comprising 100 mg/L methylene blue after incubation for three hours with PVPA-BMEP matrix: (A) PVPA crossed-linked with 40 mole % BMEP, (B) PVPA crossed-linked with 20 mole % BMEP, (C) PVPA crossed-linked with 10 mole % BMEP, and (D) PVPA crossed-linked with 5 mole % BMEP in an amount of 1000 mg/L. E shows the color of an aqueous solution 100 mg/L methylene blue.

Crosslinked polyvinylphosphonic acid (PVPA) comprising 5 mol %, 10 mole %, 20 mole %, and 40 mole % of bis[2-(methyacryloyloxy)ethyl] phosphate (BMEP) as a cross linker were tested for the adsorption of methylene blue (MB) as a model dye at concentrations of 100, 250, 500, and 1000 mg/mL. FIGS. 8-11 show time dependent adsorption of different concentration of methylene blue by cross-linked PVPA with 5 mole %, 10 mole %, 20 mole %, and 40 mole % with BMEP. The time dependent adsorption study of the dye by PVPA-BMEP shows the time required to reach equilibrium is 30 minutes and is independent from mole % of the cross linker. FIG. 12 shows the color intensity of MB after 3 hours incubation of 100 mg/L MB with 1000 mg/L of PVPA cross linked with (A) 40 mole %, (B) 20 mole %, (C) 10 mole %, and (D) 5 mole % of BMEP. The color intensity of the initial methylene blue concentration of 100 mg/L without any PVPA-BMEP is shown in (E) in FIG. 12. Dye adsorption by PVPA comprising 40 mole % BMEP cross linked was significantly more effective (98.2%) in dye removal compared to those cross linked with 20 mole %, 40 mole %, and 5 mole BMEP.

Figure 13:
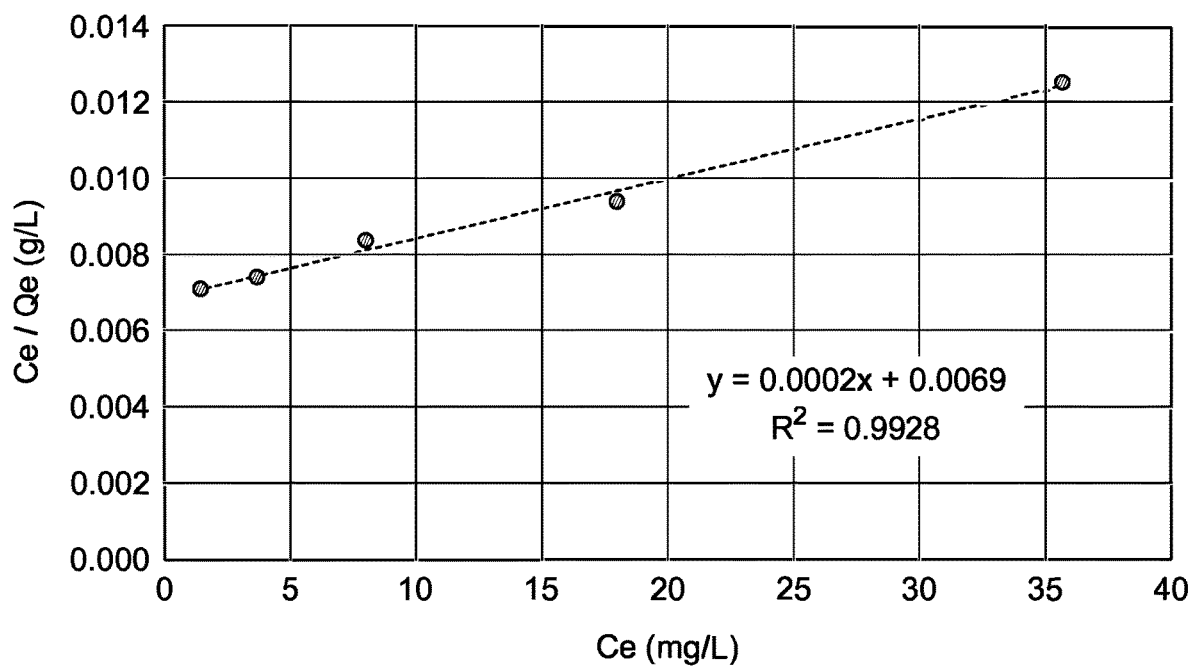
FIG. 13 shows a Langmuir isotherm model for the adsorption of methylene blue on PVPA-BMEP (40% PVPA).

FIG. 13 shows Langmuir isotherm model for adsorption of MB on PVPA-BMEP (40%). The amount of MB adsorbed on the PVPA-BMEP at equilibrium Qe (mg/g) is calculated as follows:

$$Q_e = \frac{(C_0 - C_e)V}{M}$$

Where: $C_0$ and $C_e$ are the initial and equilibrium concentrations of MB in the solution (mg/L), respectively; V is the volume of the working solution (L); and M is the mass of the PVPA-BMEP in the solution (g).

Rafatullah et al. [J. Hazard. Mater. (2010) 177, 70-80] reviewed about 185 published papers directed to the use of potentially low-cost adsorbents including agricultural wastes, industrial solid wastes, biomass, clays minerals and zeolites for the removal of MB from waste waters of textile, paper, printing and other industries. The review indicated that the "teak wood bark" displayed the highest MB adsorption capacity of 915 mg/g reaching equilibrium within 6 hours which was reported by McKay et al. [Water Air Soil Pollut. (1999) 114, 423-438]. Wang et al. [Chem. Eng. J. (2013) 228, 132-139] investigated adsorption of methylene blue (MB) on an alginate-based nanocomposite hydrogel enhanced by organo-illite/smectite clay. They found that the nanocomposite can adsorb MB with a higher adsorption capacity (1843.46 mg/g) in 30 minutes. Most recently, Yao et al. [J. Hazard. Mater. (2015) 292, 90-97] reported an efficient adsorption of MB on porous magnetic polyacrylamide microspheres. The microspheres can adsorb methylene blue with high efficiency, with an adsorption capacity of 1977 mg/g and contact time of 150 minutes.

The maximum adsorption capacity ($q_{max}$)=1/slope=1/0.0002=5,000 mg/g with significant linear correlation value of 0.996. The maximum adsorption capacity ($q_{max}$) determined by the Langmuir isotherm model reached to 5,000 mg MB/g of PVPA-BMEP which is about 2.5 time greater than those previously reported. The adsorption characteristics showed that an adsorption time of about 30 minutes is a quite fast dye removal period with respect to previously conducted studies.

The invention claimed is:

1. Aqueous solution method for forming a hydrogel composition, comprising:

mixing an aqueous solution of a vinylphosphonic acid having chemical formula I:

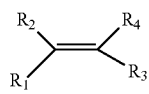

Formula I and an aqueous solution of bis[2-(methyacryloyloxy)ethyl] phosphate (BMEP) to form an aqueous mixture; and initiating a polymerization reaction in the aqueous mixture by adding an initiator selected from the group consisting of an azo compound, a ketone, and an organic peroxide to form a polymerization reaction mixture, heating the polymerization reaction mixture to form the hydrogel composition, wherein the hydrogel composition comprises a cross linked polyvinyl polymer;

wherein $R_1$ is phosphonate; and $R_2$, $R_3$, and $R_4$ are independently hydrogen, sulfonate, carboxylate, phosphonate, optionally substituted methyl, ethyl, propyl, optionally substituted cycloalkyl, or optionally substituted aryl or heteroaryl;

wherein the BMEP is present in the cross linked polyvinyl polymer in an amount of about 40 mol % based on the total molar amount of the vinylphosphonic acid of formula I and the BMEP; and wherein the cross linked polyvinyl polymer consists essentially of polymerized units of the vinylphosphonic acid having chemical formula I and the BMEP.

2. The method of claim 1, wherein the initiating comprises heating the polymerization reaction mixture at a temperature in the range of 50 to 150° C.

3. The method of claim 1, wherein the initiating comprises irradiating the polymerization reaction mixture with ultraviolet/visible light.

4. The method of claim 1, wherein the polymerization reaction is initiated with azobis(2-methylpropionamidine dihydrochloride).

5. The method of claim 4, wherein the initiating comprises heating the polymerization reaction mixture at a temperature in the range of 70 to 90° C.

6. The method of claim 1, wherein the vinylphosphonic acid of formula I is vinyl phosphonic acid.

7. The method of claim 1, wherein the cross linked polyvinyl polymer consists of polymerized units of the vinyl phosphonic acid of formula I cross-linked with the BMEP.

8. The method of claim 1, wherein the BMEP is present in the cross linked polyvinyl polymer in an amount of 40±4 mol. %.

* * * * *